United States Patent [19]
Chmela

[11] Patent Number: 4,517,433
[45] Date of Patent: May 14, 1985

[54] GAS WELDING ELECTRODE FOR A SMALL BORE

[75] Inventor: Andrew Chmela, New Berlin, Wis.

[73] Assignee: Ameco Corporation, Menomonee Falls, Wis.

[21] Appl. No.: 608,270

[22] Filed: May 7, 1984

Related U.S. Application Data

[63] Continuation of Ser. No. 355,430, Mar. 8, 1982, abandoned.

[51] Int. Cl.[3] .............................................. B23K 9/28
[52] U.S. Cl. ........................................ 219/75; 219/136
[58] Field of Search ..................... 219/72, 74, 75, 136, 219/125.1, 145.21

[56] References Cited

U.S. PATENT DOCUMENTS

| | | | |
|---|---|---|---|
| 1,534,688 | 4/1925 | Collins | 219/75 |
| 3,288,980 | 11/1966 | Rohrberg et al. | 219/125.1 X |
| 3,433,991 | 3/1969 | Whyman | 313/231 |
| 3,562,486 | 2/1971 | Hatch | 219/121 |
| 3,604,889 | 9/1971 | Rohrberg | 219/121 P |
| 3,649,805 | 3/1972 | Rohrberg | 219/121 P |
| 3,769,489 | 10/1973 | Charlesworth | 219/125 R |
| 4,300,034 | 11/1981 | Schneider et al. | 219/75 |

OTHER PUBLICATIONS

Advertisement—Metallurgical Industries Inc.
Advertisement—Statomat-Micafil.

*Primary Examiner*—Roy N. Envall, Jr.
*Assistant Examiner*—C. M. Sigda
*Attorney, Agent, or Firm*—Fuller, House & Hohenfeldt

[57] ABSTRACT

A small bore welding torch for tungsten inert gas welding includes a copper rod which functions as an electrical conductor to the tungsten electrode which is anchored in a cross bore adjacent one end of the rod and as a tie to hold two insulative sleeves in assembly. An annular passage surrounds the copper rod and between the rod and outer sleeve provides an inert gas conduit to the welding electrode which projects into a side port in a refractory sleeve.

3 Claims, 6 Drawing Figures

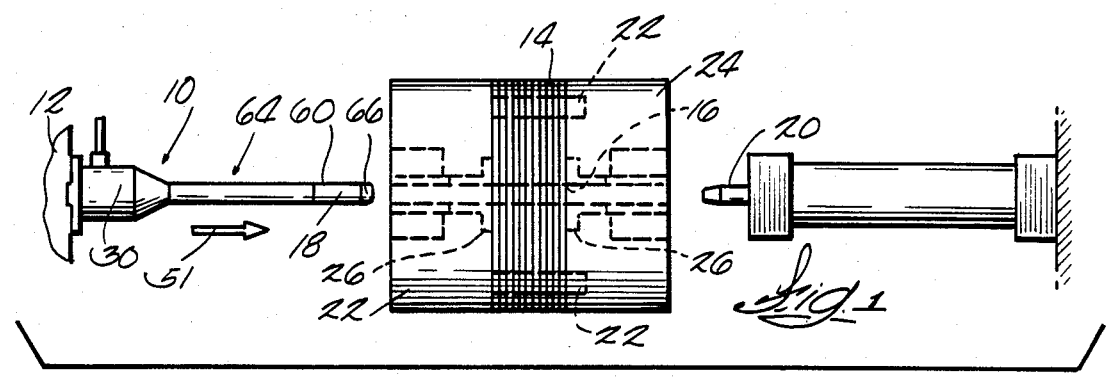
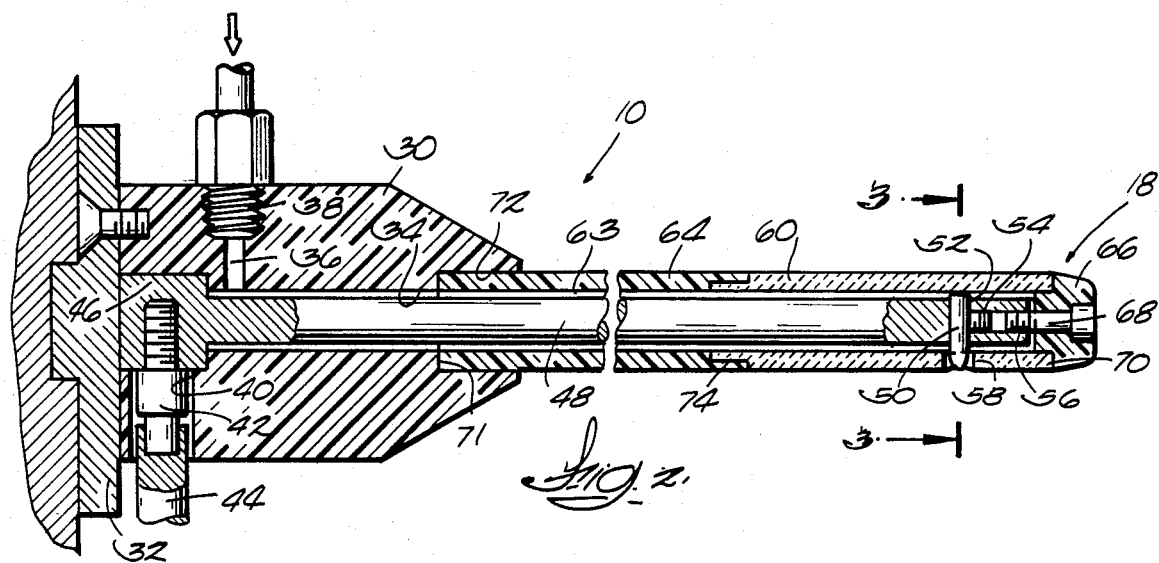

GAS WELDING ELECTRODE FOR A SMALL BORE

This application is a continuation of application Ser. No. 355,430, filed Mar. 8, 1982, now abandoned.

BACKGROUND OF THE INVENTION

The invention provides a torch for welding the inside of bores in a tungsten inert gas welding process and particularly adapted for welding in relatively small bores which are not readily accessible by electrodes. A typical application is for welding the laminations of a stator. In bore welding, copper rings are typically positioned at opposite ends of the bore and held in place by the mounting or clamping assembly for the workpiece. Desirably, the electrode can be moved axially through the bore to provide in one stroke a welded band or seam. It is also desirable that the electrode can be rotated or the workpiece indexed to provide one or more seam welds. The conductor, which must extend from the torch mounting head to the electrode, must be insulated from the bore. In addition, the high temperatures at the welding zone also require heat shielding and insulation of the electrode and conductor to minimize destruction caused by the heat.

SUMMARY OF THE INVENTION

The invention provides a torch for small bore tungsten inert gas welding which has the electrode projecting at 90° from the torch and can thus weld during movement in either longitudinal direction. The torch is provided with good electrical and heat insulation. Bore welding down to one-half inch diameter bores is practical with the torch of the invention. The copper conductor rod which provides the electrical conduction from the torch mounting head to the welding electrode also serves as a tie for holding the parts in integrated assembly. The conductor also, together with an insulative shield, defines an annular gas passage for supplying inert gas to the welding zone. The copper rod conductor is anchored to one end of a mounting head which is clampable to the welding machine which manipulates the torch in the workpiece. The copper rod extends from the mounting block and is provided with a cross bore spaced from the end of the rod. A tungsten welding electrode is located in the cross bore. A set screw adjustably positions the electrode in the cross bore.

An insulative sleeve made of a non-conductive material such as phenolic insulates the copper rod between the mounting head and the welding zone adjacent the electrode. At the welding zone, a co-axial refractory or ceramic sleeve is positioned around the copper rod and is provided with an opening into which the electrode projects. The tip of the electrode projects slightly from the refractory sleeve opening. Both the phenolic and refractory sleeves are clamped and held in assembly by a mounting cap which has a through bore and a locking screw which extends through the mounting cap and is threadably received in the end of the copper rod to thus clamp all of the parts in assembly against the mounting block anchored to the other end of the copper rod. The copper rod is spaced from the inside wall of the sleeves to provide an annular gas passage which extends past the electrode. A length of copper rod projecting beyond the electrode and forming the tip of the rod serves as a heat sink to cool the electrode.

In a modified embodiment the cooper conductor is anchored in a large copper block provided with passages for water cooling.

The refractory sleeve and phenolic insulative sleeve are replaceable by removing the locking cap and locking screw. Also, the electrode can be replaced by loosening the set screw.

The torch of the invention can be made of various sizes for different applications without changing the construction details or design concepts.

Further objects, advantages and features of the invention will become apparent from the disclosure.

DESCRIPTION OF THE DRAWINGS

FIG. 1 is a diagrammatic view of the small bore welding torch of the invention and a workpiece.

FIG. 2 is an enlarged fragmentary sectional view of the welding torch shown in FIG. 1.

FIG. 3 is an enlarged sectional view taken along line 3—3 of FIG. 2.

FIG. 4 is an enlarged perspective view of the welding electrode and end assembly of the torch.

DESCRIPTION OF THE PREFERRED EMBODIMENT

Figure 5:
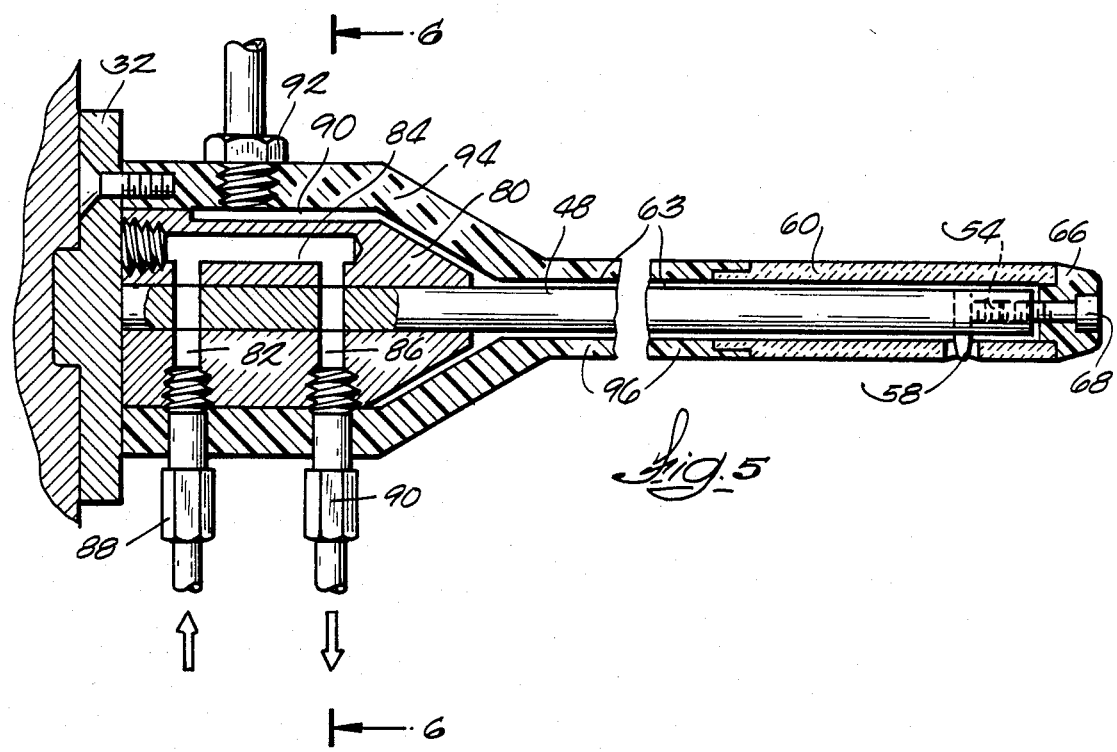
FIG. 5 is a fragmentary sectional view of a modified embodiment of the invention.
Figure 6:
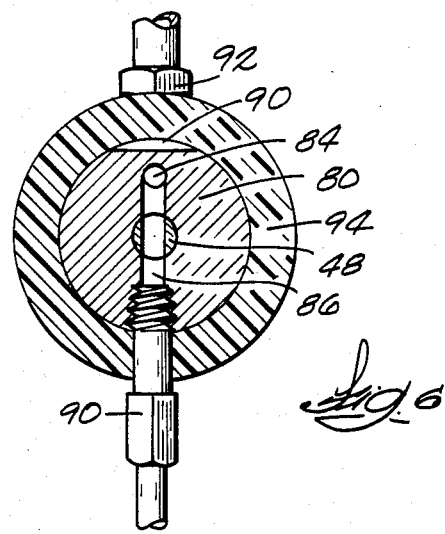
FIG. 6 is a sectional view along line 6—6 of FIG. 5.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a small bore torch 10 in accordance with the invention with the torch mounted in a chuck or clamp 12 of a welding machine (not shown) which has feed and indexing capability to position and rotate a torch with respect to a workpiece. The welding machine also desirably has a cross slide to adjust the distance between the electrode and the workpiece.

FIG. 1 also shows a workpiece 14 which can be a stack of laminations for a stator or rotor. The workpiece 14 has a bore 16 which will receive the end 18 of the welding torch. FIG. 1 also includes a locating pin 20 which can be employed to center the laminations and locating pins 22 for properly orienting the individual lamina of the stator 14. The laminations are clamped between clamping members 22 and 24. Copper sleeves or bushings 26 are employed to start the weld bead before the electrode enters the bore of the workpiece.

In accordance with the invention, the torch 10 includes a mounting head 30 with a cap 32 which enables access to the bore 34 of the mounting head. The cap 32 and mounting head can be employed for mounting and supporting the torch 10 in the welding machine. The mounting head 30 also includes a passage 36 in communication with an inert gas inlet fitting 38 for an inert gas. The mounting block 30 also includes a passage 40 which receives an electrical terminal 42 for connection to the electric supply 44 for the electric welding process. The terminal 42 is connected to a copper block 46 which is integrally formed with a copper rod or conductor 48 which conducts the electricity to the tungsten welding electrode 50.

The copper rod is provided with a cross bore 52 which receives the electrode 50. The cross bore 52 is desirably at 90° with respect to the longitudinal center line of the torch and the direction of longitudinal feed represented by arrow 51. A set screw 54 is threadably received in a bore 56 in the end of the rod 48 and provides adjustment capability for positioning the electrode 50.

The electrode 50 projects through a bore or gas passage 58 in a refractory or ceramic sleeve 60. A recess 61 surrounding the bore provides some clearance between the sleeve 60 and the workpiece and provides improved gas flow around the electrode 50. The sleeve 60 resists the high temperatures in the welding zone and protects the conductor 48 and helps maintain the integrity of annular gas passage 63 located between the conductor 48 and an insulative sleeve 64 which extends from the mounting block to the refractory sleeve 60. The insulative sleeve 64 can be made from phenolic, some plastics or other high temperature resistant electrical insulator. The temperature resistance of sleeve 64 is not required to be as high as for the sleeve 60. Hence a ceramic or refractory material is not required.

The sleeves 60 and 64 are secured in integrated assembly with the mounting block 30 by an end cap 66 which is made of phenolic, ceramic or other insulative material and a set screw 68 which is threadably received in the bore 56. A shoulder 70 on the end cap 66 presses the ceramic or refractory sleeve 60 against the phenolic or insulative sleeve 64 which can have an end 71 anchored in a counterbore 72 in the mounting block. A lap joint 74 between the refractory shield 60 and the phenolic or insulative sleeve 64 can also be employed. The end cap also maintains the concentricity of the conductor 48 in the sleeves 60 and 62 for uniformity of gas flow to the electrode. The gas passage surrounds the copper electrode and also extends to the end cap 66. The electrode 50 is desirably centered in the bore 58 so that the exiting gas surrounds the electrode. The end of the copper rod 48 between the electrode and the end cap serves as a heat sink to help cool the electrode 50.

The torch construction of the invention provides maximum protection for the components yet provides a compact unit for small bores. In use the torch will be moved adjacent the bore to be welded and then fed through the bore to weld a seam to join the laminations. The workpiece or torch can then be indexed to provide a second weld spaced 180° from the first weld. The torch can also be used to provide a helical weld bead on the inside of a bore if the machine can provide both a rotary and longitudinal feed.

FIG. 5 shows a modified embodiment of the torch in which water cooling is provided. In this regard the copper conductor 48 is mounted in a copper heat sink or block 80. The rod 48 can be brazed or otherwise secured to the block 80. A water cooling passage is provided which comprises passage portions 82, 84 and 86. The passages 82, 86 can be formed by drilling after the rod 48 is mounted in the block 80. Water inlet and outlet fittings 88 and 90 can be provided.

The block 80 is provided with a recess 90 to provide communication between the gas inlet fitting 92 and gas passage 63.

The block 80 can be enclosed by a phenolic or other insulative shield 94 which is integral or separated from sleeve portion 96.

The end cap assembly and electrode mounting arrangement for the embodiment disclosed in FIG. 5 can be the same as that illustrated in FIG. 2 with a set screw 54 and locking screw 68. The screw 68 prevents the screw 54 from becoming loose as a result of thermal expansion and contraction.

I claim:

1. An integrated electric arc torch assembly of a conductor rod having a shoulder which forms an abutment at one end, a mounting block, an electrical insulating sleeve, a refractory sleeve having an electrode aperture and means for securing said components in said assembly, said mounting block receiving and supporting said rod and said insulated sleeve extending from said mounting block and providing a gas passage between said conductor rod and said sleeve, said insulating sleeve being seated against an abutment on said mounting block, an electrode projecting from said conductor through said electrode aperture, means for adjustably securing said electrode to said conductor, a refractory sleeve surrounding the lower end of said conductor and said electrode and having wall means defining a gas outlet located in the side wall of said sleeve and said electrode projecting through said gas outlet and spaced from said gas outlet wall means to provide an annular gas passage therebetween, said means for securing said components in assembly including connector means for connecting said refractory sleeve to said conductor rod to connect said insulative sleeve and refractory sleeve in integrated assembly with said mounting block, said refractory sleeve and said insulative sleeve having interfitting joinable end parts, said connector means including an insulative end cap, and screw means extending through said cap, said cap having a shoulder engageable with said refractory sleeve and said screw means being threadably received in a threaded aperture in the end of said conductor to clamp said joinable end parts of said refractory sleeve and insulative sleeve in assembly against said conductor abutment and to provide a gas seal at said end parts.

2. The electric arc torch assembly of claim 1 wherein said wall means defining a gas outlet includes a recess in said refractory sleeve around said gas outlet to facilitate gas flow around said electrode.

3. The electric arc torch assembly of claim 1 wherein said conductor has a cross bore and said electrode being received in said cross bore, said cross bore being spaced from the end of said rod to provide an end portion heat sink between said rod bore and the end of said electrode to cool said electrode at one end of said rod, said end portion of said rod having a threaded bore, a set screw inserted in said bore and engaged with said electrode to press said electrode against the inside of said cross bore.

* * * * *